March 18, 1969   J. W. SKELLEY ET AL   3,433,088
STEERING COLUMN TRANSMISSION SHIFT CONTROL
Filed May 16, 1967
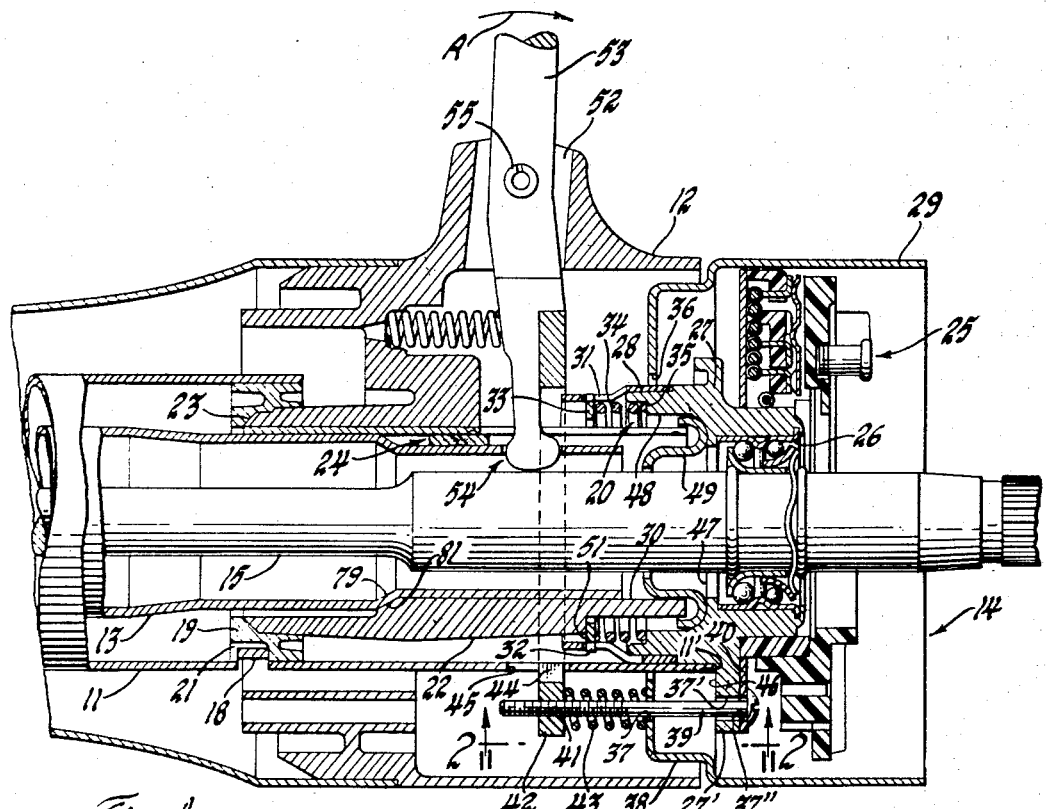
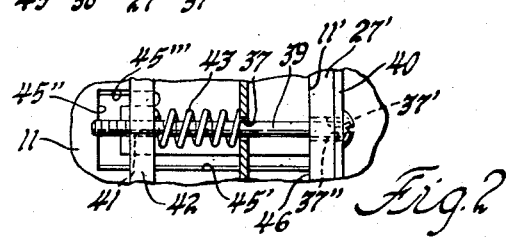
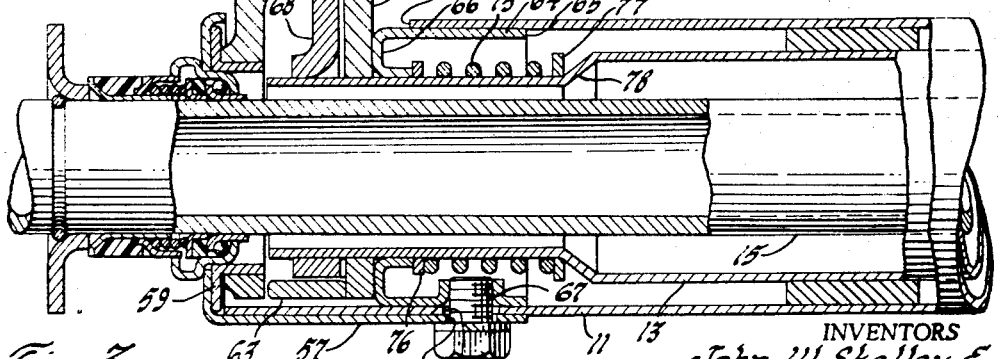
INVENTORS
John W. Skelley &
BY Leonard F. Grandel
a. M. Heiter
ATTORNEY

United States Patent Office 3,433,088
Patented Mar. 18, 1969

3,433,088
STEERING COLUMN TRANSMISSION SHIFT CONTROL
John W. Skelley and Leonard F. Grandel, Saginaw, Mich., assignors to General Motors Corporation, Detroit, Mich., a corporation of Delaware
Filed May 16, 1967, Ser. No. 638,955
U.S. Cl. 74—484                                    12 Claims
Int. Cl. G05g 11/00

ABSTRACT OF THE DISCLOSURE

A steering column mounted shift mechanism with a cap assembly, having a shroud, a turn signal mechanism, a cap member, a support column and a lock ring. The lock ring is secured to the cap assembly with a fastener while being spaced therefrom by a coil spring. The support column has a slot, located at its upper end, which is engaged by a projection on the lock ring so that when the fastener is tightened the cap assembly will be drawn onto the support column.

---

This invention relates to steering column mounted shift linkages and more particularly to a structure which will permit a simple and efficient method of assembling the turn signal shroud and the support column. Also, this invention contemplates the mounting of the manual shift lever housing so that it will be permitted to rotate relative to the support column, but prevented from moving axially relative to the support column.

In transmission linkage controls mounted on the steering column assembly, the manual shift control lever, located below the steering wheel, is pivotally mounted in a housing to reciprocate a control tube which is concentric to a stationary tubular support column. The manual lever also rotates the housing and the control tube. The control tube has a controlling lever fixed to its lower end, which selectively engages controlled levers, that are rotatably mounted on the control tube and support column, when the control tube is reciprocated. Rotation of the control tube causes the controlled lever engaged with the controlling lever to rotate.

In shift linkages of this type, the housing is restrained from axial movement relative to the support column but permitted to rotate with the control tube relative to the support column; while the control tube must be free to reciprocate relative to the support column and the housing. Thus, the control tube is reciprocated to cause the controlling lever, attached thereto, to engage either the reverse-low controlled lever or the second-high controlled lever; whereupon rotation of the housing, control tube and the preselected controlled lever, the desired gear ratio in a change-gear transmission is established.

An object of this invention is to provide a method of assembling the turn signal shroud to the support column.

Another object of this invention is to prevent axial movement between the support column and the manual shift lever housing, while permitting relative rotary movement therebetween, in a steering column mounted transmission control linkage.

These and other objects of the invention will be more apparent from the following description and drawing of the preferred embodiment.

FIGURE 1 is an elevational view in section showing the upper end of the shift linkage and steering column assembly.

FIGURE 2 is a plan view taken along the line 2—2 in FIGURE 1.

FIGURE 3 is an elevational view in section showing the lower end of the shift linkage and steering column assembly.

The invention is illustrated in a steering column assembly having a support column 11, a housing 12, a control tube 13, a cap assembly or cover shown generally at 14, and a steer shaft 15. The support column 11 is generally tubular in shape and encloses the steer shaft 15 and the control tube 13. Near the upper end of the support column 11 are a plurality of indentations 18 in the support column 11 which axially support a bearing 19 having a plurality of scalloped recessed portions 21 to match the indentations 18. The bearing is radially supported by the inside diameter of the support column.

The housing 12 has a sleeve portion 22 concentric to the support column 11, and having a lower end 23 frusto-conical in shape and contacting the bearing 19 which affords radial and axial support to the sleeve portion 22. The control tube 13 is concentric to the sleeve portion 22 and contacts a portion of the inside diameter 30 thereof so that the control tube 13 is slidably supported. The housing 12 and the control tube 13 are in driving relation through a key and keyway shown generally at 24 to permit relative axial movement between the members, but prevent relative rotary movement between them.

The cap assembly 14 includes a turn signal mechanism shown generally at 25, a turn signal shroud 29, a bearing housing assembly or cap assembly shown generally at 20, and a bearing 26 which supports the steer shaft 15. The bearing housing assembly 20 is comprised of a bearing housing or cap member 27, generally cylindrical in shape, a shell 28, a thrust washer 33 and a force storing compressible member, such as a coil spring 34. The shell 28 has a plurality of slots 31 which receive radially extended tangs 32 of the thrust washer 33. The coil spring 34 is placed between the thrust washer 33 and a spring seat 35 on the bearing housing 27 so that, when the shell 28 is pressed on an outside diameter of the bearing housing 27, the spring 34 is held in compression therebetween. The bearing housing has a plurality of flanged portions 27' having apertures 37' and the turn signal mechanism has a base plate 40 having a plurality of apertures 37''. The turn signal shroud 29 is cup shaped having a large aperture 36 and a plurality of smaller apertures 37 spaced between the large aperture 36 and a side wall 38. Fasteners 39 extend through the apertures 37, 37' and 37'', which are axially aligned, and engage threaded holes 41 in a collar or lock ring 42. The fasteners 39 are each surrounded by a coil spring 43 slightly compressed to maintain a spaced relationship between the lock ring 42 and the turn signal shroud 29 during assembly. The collar 42 is annular in shape and has a projection 44 extending radially inward from its inside diameter which engages a slot 45 in the support column 11. When the fasteners 39 are drawn tight the upper end 11' of the support column 11 abuts a shoulder portion or abutment 46 of the cap member 27, thereby securing the support column 11 to the cap assembly 14.

The slot 45, as seen in FIGURE 2, is generally of a J-shape configuration having an upstanding open leg 45', a circumferential portion 45'' and an upstanding closed leg 45'''. The upstanding leg 45' is open at the upper end 11' of the support column 11. The cap assembly 14 is attached to the support column by aligning the projection 44 of the collar 42 with the upstanding leg 45' of slot 45, moving the cap assembly 14 downward until the projection 44 is aligned with the circumferential portion 45'', rotating the cap assembly 14 until the projection 44 is aligned with the upstanding leg 45'''. With the cap assembly 14 in this position, the fasteners 39 can be tightened drawing the collar 42 upward, or to the right as viewed in FIGURE 1, so that the projection 44 will contact the end of the upstanding closed leg 45''', thereby drawing the cap assembly 14 onto the support column 11 until the upper end 40 of the support column 11 abuts the shoulder portion 46 of cap 27.

The cap member 27 has an abutment 47 that serves as a stop to locate a bearing 49 which is pressed in the inside diameter 48. The bearing 49 radially supports the housing 12 through contact with the inside diameter 30 of the sleeve portion 22. The sleeve portion 22 has a shoulder 51 which contacts the thrust washer 33 and causes the coil spring 34 to be further compressed. The force exerted by the coil spring 34 holds the housing 12 in contact with the bearing 19 and prevents axial movement of the housing relative to the support column 11.

The housing 12 has an aperture 52 through which extends a manual shift lever 53. The lever 53 is pivotally connected to the housing 12 with a pin 55 and to the control tube 13 with a ball and socket type joint 54. When the lever 53 is pivoted on the pin 55, the control tube 13 reciprocates relative to the support column 11 and the housing 12. When the lever 53 is rotated, the control tube 13 and the housing 12 are rotated relative to the support column 11.

The support column 11, as seen in FIGURE 3, has a plurality of apertures 56 spaced about the circumference near the lower end. A sleeve member 57, open on one side, contacts the outside diameter of the support column 11 and extends upward beyond the apertures 56. The sleeve 57 has angled slots 58 which are aligned with the apertures 56. The bottom of the sleeve 57 is turned inward and has a bearing 59 welded thereto. A lower controlled lever 61 is rotatably and axially supported by the bearing 59 and extends radially outward from the bearing 59 through the open side of said sleeve 57 and an opening 60 at the lower end of the support column 11. An upper controlled lever 62 is rotatably mounted on the control tube 13 and extends radially outward from the control tube 13 through the open side of the sleeve 57 and the opening 60. A spacer is located between the upper and lower controlled lever to maintain a minimum clearance between them. The spacer 63 extends around a portion of the circumference of the control tube 13. The upper controlled lever is in contact with a bearing 64 which is radially supported by the support column 11. The bearing 64 is cylindrical on its upper portion 65 and has a U-shaped cross section on its lower portion 66. The upper portion 65 of the bearing 64 has a plurality of threaded apertures, spaced about its circumference, which are aligned with the apertures 56 on the support column 11. A controlling lever 68 is welded to the lower end of the control tube 13. The controlling lever 68 extends radially outward, in a plane parallel to the controlled levers 61 and 62, from the control tube 13 through the open side of the sleeve member 57 and the opening 60. The controlling lever 68 has a slotted portion 69 on its extended end 71. The controlling lever 68 is reciprocated with the control tube 13 thereby permitting the slotted portion 69 of the controlling lever 68 to engage either a projection 72 on the upper controller lever 62 or a projection 73 on the lower controlled lever 61. Rotation of the control tube 13 and the controlling lever 68 cause the controlled lever so engaged to rotate. The controlled levers 61 and 62 are connected, through linkages not shown, to the shift forks of a change-gear transmission, not shown.

To ensure proper clearance between the upper controlled lever 62 and the lower controlled lever 61, a plurality of fasteners 74 are inserted through the aperture 56 and the slot 58 and threaded into the aperture 67. The aperture 56 is sufficiently larger than the fastener 74 to permit some axial adjustment thereby setting the upper position of controlled lever 62. The sleeve 57 can be rotated and, due to the angular slots 58, the fasteners 74 affixed in bearing 64 move bearing 64, upper controlled lever 62, the controlling lever 68, and the control tube 13 axially relative to lower controlled lever 61, thereby obtaining the proper clearance between the controlled levers 61 and 62. When the proper clearance is obtained, the fasteners 74 are tightened to hold the members in the relationship thus established. A coil spring 75, coiled about the control tube 13, contacts a thrust washer 76 on its lower end and a thrust washer 77 on its upper end. The thrust washer 76 abuts the bearing 64 and the thrust washer 77 abuts an abutment portion 78 of the control tube 13. During the establishment of the proper clearance between the controlled levers 61 and 62, the compressed spring 75 forces the control tube 13 in the upward position shown. The upward position of the control tube is established by contact between upper controlled lever 62 and controlling lever 68 which was established when proper clearance was obtained between the controlled levers 61 and 62.

The shift pattern of the manual lever is generally H-shaped, as is conventional in this type of transmission. The second and third gear shift positions being on one upright leg of the H and low and reverse gear shift positions being on the other upright leg of the H. The crossbar of the H is the neutral position. The control tube 13 and manual lever 53 are biased, by spring 75, in the second and third gear shift position. Hence a shift to second or third gear can be made merely by rotating the manual lever 53 counterclockwise or clockwise as viewed from the upper or steering wheel end of the steering column assembly. Rotation of the manual lever 53 causes control tube 13, controlling lever 68, and controlled lever 62 to rotate thus establishing the desired gear position. To effect a shift to low or reverse, the manual lever 53 must be pivoted in the direction of arrow A. This movement causes control tube 13 and controlling lever 68 to move downward, thereby disengaging slot 69 from projection 72 and engaging slot 69 with projection 73. Rotation of the manual lever 53 causes controlled lever 61 to rotate thus establishing the desired gear position. To change from low or reverse to second or third, the manual lever 53 must be moved through the neutral position. Once a gear position other than neutral has been established, the controlling lever 68 cannot come out of engagement with the respective controlled lever because the unslotted portion of the extended end 71 has sufficient width so that it will contact the projection of the unshifted controlled lever.

Obviously many variations and modifications of the present invention are possible in view of the above teachings. It is therefore understood that within the scope of the appended claims, the invention may be practised otherwise than as specifically described.

What is claimed is:

1. In a control linkage, a support column having bearing stop means, a housing rotatably moveable relative to said support column, bearing means between said bearing stop means on said support column and said housing, a cap assembly having a spring seat, means for securing said cap assembly to said support column including a J slot in said support column, a force storing compressible member compressed between said spring seat and said housing urging said housing against said bearing means, a control tube concentric to said support column and being axially and rotatably moveable relative thereto, means for preventing rotation and permitting axial movement of said control tube relative to said housing, means for moving said control tube axially and rotatably relative to said support column and axially relative to said housing, and means for positioning a shift linkage of a change-speed transmission upon rotary movement of said control tube.

2. The invention defined in claim 1 and means for securing said cap assembly to said support column further including an annular collar, an abutment on said cap assembly, at least one aperture in said cap assembly, and at least one fastener, said collar having a projecting surface at its inside diameter and a threaded aperture on its annular surface, said projecting surface being engaged in said J slot, said fastener extending through said aperture and engaging said threaded aperture, said fastener being tightened until said support column abuts said abutment thereby securing said cap assembly to said support column.

3. The invention defined in claim 2 and said means for preventing rotation and permitting axial movement of said control tube relative to said housing including a key and keyway, means for moving said control tube axially and rotatably including a manual lever fixed for pivotal movement in an aperture in said housing and connected to the control tube with a ball and socket joint, and said means for positioning said shift linkage including a first and second controlled lever rotatable relative to said support column, a controlling lever rotatable relative to said support column and secured to said control tube for axial and rotary movement therewith, and means for selectively engaging said controlling lever with one of said first and second controlled lever upon axial movement of said control tube and rotating said selected controlled lever upon rotation of said control tube.

4. In a control linkage, a tubular support column having an aperture therein, a housing member rotatable relative to said support column and extending through said aperture, a cap assembly, securing means including a J slot in said support column for assembling said cap assembly and said support column, bearing means carried by said support column axially and radially supporting said housing, resilient load means carried by said cap assembly, said bearing means and resilient load means cooperating to hold the housing in axial relationship with the support column, a control tube concentric to said support column and said housing and being free to move axially relative thereto, drive means between said housing and said control tube to prevent relative rotary movement therebetween, and means on said housing and said control tube for selecting a shift position in a change gear transmission.

5. The invention defined in claim 4 and said support column having inwardly extending projections engaging said bearing means, said resilient load means including a coil spring coiled about a portion of said housing and engaging a spring seat in said cap assembly on one end and a thrust bearing on another end, said thrust bearing contacting said housing, a bearing member fixed to said cap assembly radially supporting said housing, and said means for assembling said cap assembly and said securing means further including a lock ring having a projection engaging said J slot, at least one fastener extending through an aperture in said cap assembly and being threaded into a threaded aperture in said lock ring, and a coil spring being coiled about said fastener and held in compression between said cap assembly and said lock ring thereby maintaining a spaced relation therebetween during assembly of said cap assembly on said support column.

6. A method of assembling a steering column mounted transmission shift linkage having a support column having an upper end and a cap assembly having an abutment comprising the steps of inserting threaded fasteners through a plurality of apertures in said cap assembly, placing a compressible coil spring over each of said fasteners, threading said fasteners in threaded apertures in a lock ring until said coil springs are slightly compressed between said lock ring and said cap assembly, engaging a projecting surface of said lock ring into an open end of a J-shaped slot in said support column, rotating said cap assembly and said lock ring so that said projecting surface is aligned with a closed end of said J slot, and tightening said fastener so that said projecting surface contacts said closed end, whereby said upper end contacts said abutment thereby securing said cap assembly to said support column.

7. A method of assembling a steering column mounted shift linkage comprising the steps of inserting a bearing in a tubular support column having preformed indentations to provide a bearing stop, placing a housing having an inner sleeve portion over said support column so that a lower end of said inner sleeve portion contacts said bearing for axial support, inserting a threaded fastener in each of a plurality of apertures in a cap assembly comprising a turn signal mechanism, a turn signal shroud and a bearing housing having a spring seat, a thrust washer and a coil spring compressed between said spring seat and said thrust washer, placing a coil spring over each of said fasteners, threading said fasteners into threaded apertures in a lock ring until said coil springs are slightly compressed between said lock ring and said turn signal shroud, engaging a projecting surface on said lock ring with an open end of a J slot in said tubular support column, rotating said cap assembly and said lock ring until said projecting surface is aligned with a closed end of said J slot, and tightening said fasteners so that said projecting surface contacts said closed end and said tubular support column is drawn into contact with said bearing housing and said housing is drawn into contact with said thrust washer thereby further compressing said first mentioned coil spring so that said housing is fixed in axial relationship with said tubular support column.

8. A steering column mounted shift mechanism comprising a tubular support column having an upper end, a plurality of indentations near said upper end and a J slot having a closed end and an open end at the upper end of said tubular support column, a bearing axially supported by said indentations, a housing having a sleeve portion inside said support column and contacting said bearing, a cap assembly having a turn signal mechanism, a shroud and a bearing housing assembly, a plurality of apertures in each of said turn signal mechanism, said shroud and said bearing assembly being axially aligned, a threaded fastener extending through each of said apertures and engaging threaded apertures in a lock ring, a coil spring circumferentially adjacent to said fasteners being held in compression between said shroud and said lock ring and maintaining a spaced relationship between said shroud and said lock ring during assembly, a projection on said lock ring contacting the closed end of said J slot and said upper end of said support column contacting the bearing housing assembly thereby securing the cap assembly and the lock ring to said support column, said bearing housing assembly comprising a bearing housing having an inner diameter with a bearing pressed therein, a shell pressed on an outer diameter of said bearing housing, a thrust washer having tang members extending through a plurality of slots in said shell and a coil spring compressed between the bearing housing of the thrust washer, said thrust washer contacting said sleeve portion and said last-mentioned coil spring cooperating with said indentations to maintain an axial relationship between said support column, said housing and said bearing.

9. The invention defined in claim 8 and said housing having a portion surrounding said tubular support column, an aperture in said housing through said portion, a manual shift lever extending through said aperture and through a circumferential aperture in said tubular support column, a pin member pivotally connecting said manual shift lever to said housing, a control tube spaced inside said support column and having an upper portion contacting an inside diameter of said sleeve portion, drive means between said manual shift lever and said control tube including a ball and socket type joint, and rotary drive means between said housing and said control tube including a key and keyway.

10. A steering column mounted shift mechanism comprising a support column, a housing, a cap assembly having a turn signal mechanism having a base plate, a shroud and a bearing housing assembly having a plurality of flanged portions spaced between said turn signal mechanism and said shroud, abutment means on said bearing housing assembly contacting said support column, first bearing means for supporting said housing radially and axially, bearing support means on said support column for supporting said first bearing means, a control tube reciprocal and rotatable within said support column, means on said housing for slidably supporting said control tube, a lock ring having a plurality of threaded apertures and a projecting surface, slot means on said support column engaging said projecting surface, shift means on said housing for reciprocating said control tube, drive means on said housing and control tube for rotating said housing and control tube in unison, second bearing means on said bearing housing assembly for rotatably supporting said housing, first spring means on said bearing housing assembly cooperating with said bearing support means for maintaining axial relationship between said housing, said first bearing means and said support column; axially aligned apertures in said base plate, said flanged portions and said shroud; fastener means extending through said axially aligned apertures and engaging said threaded apertures thereby securing said lock ring, said turn signal mechanism, said bearing housing assembly and said shroud to said support column; and second spring means coiled about each of said fasteners and held in compression between said lock ring and said shroud for maintaining axial relationship between said shroud and said lock ring during assembly of said cap assembly and said support column.

11. In a control linkage, a support column having bearing stop means, a housing rotatably movable relative to said support column, bearing means between said bearing stop means on said support column and said housing, a cap assembly having a seat, means for securing said cap assembly to said support column including slot means having an open ended axial portion and a closed ended circumferential portion in said support column and a lock ring on said cap assembly having means engaging the slot means, a force storing compressible member between said seat and said housing urging said housing against said bearing means, securing means supporting said lock ring on said cap assembly in an unsecured position to enter said open ended axial portion and, without substantial compression of said force storing member, enter said closed ended circumferential portion of said slot means and movable to a secured position compressing said force storing compressible member and securing said cap assembly and housing in place, a control tube concentric to said support column and being movable relative thereto, means for preventing rotation of said control tube relative to said housing and for moving said control tube relative to said support column, and means for positioning a shift linkage of a change-speed transmission upon rotary movement of said control tube.

12. In a control linkage, support column means; cap assembly means assembled on said support column means; housing means rotatably mounted on said support column means; force storing compressible means between said cap assembly means and said housing means resiliently locating the housing means on the support column means; means for securing said cap assembly means to said support column means including slot means in said support column, a lock ring resiliently mounted on said cap assembly means surrounding said support column means and having an inward projection surface engaging the slot means and spring means between said cap assembly means and said lock ring for maintaining axial relationship between cap assembly means and said lock ring during assembly on said support column means; said force storing compressible means between said cap assembly means and said housing means urging said housing means against said support column means, a control tube concentric to said support column means and means on said housing means for moving said control tube rotatably relative to said support column means and axially relative to said housing means and said support column means.

References Cited

UNITED STATES PATENTS

| | | | |
|---|---|---|---|
| 2,638,013 | 5/1953 | Dodt | 74—484 |
| 2,924,988 | 2/1960 | Primeau | 74—485 X |
| 3,025,715 | 3/1962 | Grady | 74—485 X |
| 3,049,023 | 8/1962 | McCordic | 74—484 |

DONLEY J. STOCKING, *Primary Examiner.*

L. H. GERIN, *Assistant Examiner.*

U.S. Cl. X.R.

336—208